No. 741,794. PATENTED OCT. 20, 1903.
T. J. HUBBELL.
SULKY BEET ROOT CUTTER.
APPLICATION FILED AUG. 19, 1902.
NO MODEL.

WITNESSES
Chas. L. Hyde
M. C. Nickelson

INVENTOR
Thomas J. Hubbell
By Hazard & Harpham
ATTORNEYS.

No. 741,794. Patented October 20, 1903.

UNITED STATES PATENT OFFICE.

THOMAS J. HUBBELL, OF LOS ANGELES, CALIFORNIA, ASSIGNOR OF THREE-ELEVENTHS TO H. C. NORRIS AND C. E. NORTON, OF LOS ANGELES, CALIFORNIA.

SULKY BEET-ROOT CUTTER.

SPECIFICATION forming part of Letters Patent No. 741,794, dated October 20, 1903.

Application filed August 19, 1902. Serial No. 120,225. (No model.)

*To all whom it may concern:*

Be it known that I, THOMAS J. HUBBELL, a citizen of the United States, residing at Los Angeles, in the county of Los Angeles and State of California, have invented new and useful Improvements in Sulky Beet-Root Cutters, of which the following is a specification.

My invention relates to means to cut the tap-roots of beets while the beets are in the ground ready to be harvested, so as to facilitate their removal in harvesting them; and the object of my invention is to provide means to facilitate the harvesting of beets. I accomplish this object by means of the mechanism described herein and illustrated in the accompanying drawings, in which—

Figure 1:
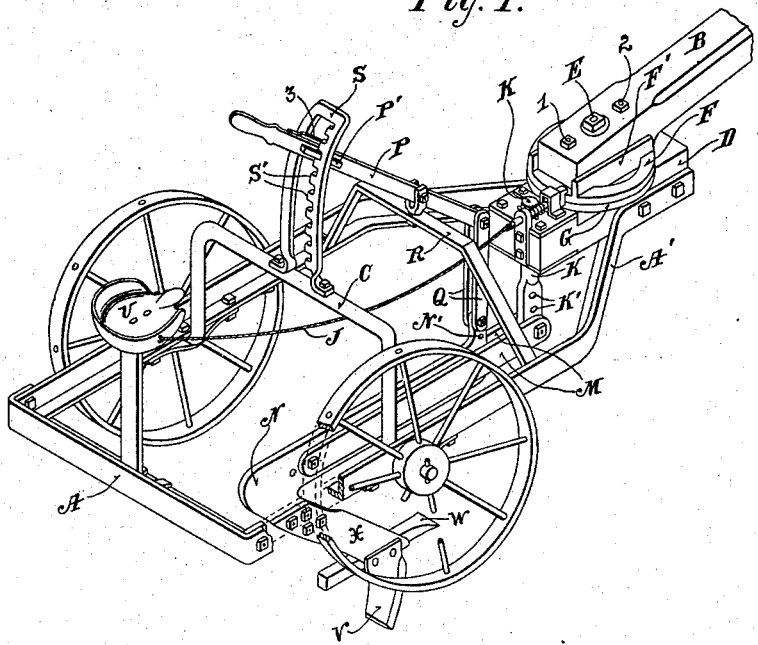
Figure 2:
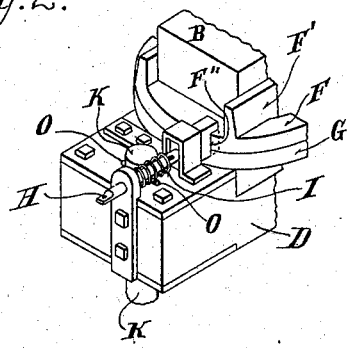

Figure 1 is a perspective view of a sulky beet-root cutter embodying my invention. Fig. 2 is an enlarged detailed view of a fragment of the pivotal connection of the tongue with the head-block in the frame of the sulky.

My invention has relation more particularly to means for harvesting sugar-beets. These beets are usually planted in rows from sixteen to eighteen inches apart, and when ready for harvesting the tap-root has penetrated so far into the ground that the beets can only be removed with considerable labor unless the tap-root is cut; and the purpose of my invention is to provide simple and reliable means for cutting the tap-root just below the body of the beet, at the same time loosening the earth around the beet in order that the beet may be easily removed thereafter.

In the drawings the frame of the beet-root cutter comprises side pieces A' A', of angle-iron, which converge toward one another at their forward ends. A back piece A, of angle-iron, embraces and connects the rear ends of the side pieces, and a head-block D is received between and supported by the converged forward ends of the side pieces, to which it is attached. The frame rests upon and is secured to a U-shaped axle in any suitable manner, the ends of the axle being provided with wheels. A tongue B is secured to the head-block D by means of a king-bolt E, and secured to the under face of the tongue by means of the bolts 1 and 2 is a circular or annular horizontally-disposed plate F, which plate is provided with a plurality of upwardly-projecting flanges F' F', between which the tongue fits snugly, being drawn therebetween by means of the bolts 1 and 2. This plate rests upon a companion plate G, of like shape and size, rigidly affixed to the head-block. These two plates are held in frictional engagement by the king-bolt E, whereby a pivotal connection is established between the tongue and the head-block.

Mounted on the head-block and in the rear of the plate F is the spring-pressed detent-bolt H. This bolt has a square forward end adapted to enter a recess or socket F''' (shown in dotted lines in Fig. 2) in the plates F and G and hold them in a locked position when the detent-bolt is in its advanced position, as shown in the drawings. The spiral spring I will tend to hold the detent-bolt in its advanced position, and when it is in that position the tongue will be in direct alinement with the sulky-frame. Now when it is intended to make a short turn with the sulky, the detent-string J, removably secured to the seat U at one end and to the detent-bolt at the other end, is drawn back. This will withdraw the detent-bolt from its socket and unlock the two plates and permit the sulky to be turned abruptly around. The release of the string will again permit the spring to advance the bolt, and when the tongue returns to its position in alinement with the sulky-frame, the spring will advance the detent-bolt into the socket and lock the tongue.

The draft-standard K projects upwardly through the head-block, to the lower end of which standard are secured the side bars M, the rear ends of which are pivoted to the plow-beam N. In the draft-standard below the head-block are holes K' for engaging a clevis to which to secure the doubletree, while at the upper end of the draft-standard are adjusting-pin holes (not shown) for the reception of the adjusting-pin O, by means of which the plow may be adjusted as to elevation.

The forward end of the plow-beam N is pivotally connected with the hand-lever P by the lifting-straps Q, the hand-lever being pivoted centrally in bearings on the upright lever-support R. The free end of the hand-lever passes through the adjusting rack-guide S, (mounted on the upturned center of the sulky-axle C,) which rack-guide is provided with notches S' to engage the flange P' on the hand-lever and hold the same in any adjusted position. The lever is held spring-pressed against these notches by the spring 3. It will be manifest that the elevation of the free end of the hand-lever will operate to depress the point of the plow and cause it to run into the ground, while to depress the hand-lever will cause the point of the plow to run out of the ground. Holes N' on the forward end of the plow-beam, in combination with the bolt which secures this end of the beam to the supporting-straps, will afford additional means to adjust the elevation of the plow. The cutting-wing V on the plow-standard X will pass below the beet and cut the tap-root thereof and at same time, loosen the beet and the ground around it, so that it can be easily removed from the ground. The point of the plow W on the land side will operate to steady the cutting-point and hold the same firmly to its work.

Having described my invention, what I claim as new, and desire to secure by Letters Patent, is—

1. A beet-root cutter comprising a frame, the frame composed of sides, the forward ends of which converge, a head-block located between and connecting the forward converging ends of the sides, a bar connecting and embracing the rear ends of the sides, an axle carried by the sides of the frame and independent of the bar, a plow-beam, a cutter carried thereby, means for movably connecting the plow-beam to the frame and means for effecting an adjustment of the plow-beam.

2. A beet-root cutter comprising a frame of angle-iron, the forward ends of the frame converging, a head-block received between and secured to the converging ends of the frame, the block being supported on the angle-iron, a plow-beam pivotally secured to the frame, a cutter carried by the plow-beam, and means carried by the frame for adjusting the plow-beam.

3. In a beet-root cutter, the combination with a frame, of a head-block supported in the frame, a draft-standard adjustably secured to the head-block, a plow-beam, cutters carried thereby, side bars pivotally connecting the plow-beam and the standard, a suitably-supported hand-lever and means connecting the hand-lever and the plow-beam, respectively.

4. In a beet-root cutter, the combination with a frame, of a head-block carried thereby, a standard supported by the head-block, a plow-beam, a cutter carried thereby, a side bar extending on each side of the plow-beam and pivotally connected at their rear ends to the rear end of the plow-beam, the forward ends of the side bars being pivotally connected to the draft-standard, means for adjusting the elevation of the plow-standard, and a tongue connected with the head-block, the tongue normally retained in fixed relation therewith.

5. In a device of the character described, the combination with a frame comprising side and end bars, of an integral arched axle supported in the frame, wheels carried by the axle, a head-block supported in the frame, a tongue secured to the head-block, a standard depending from the head-block, links connected to the standard, a plow-beam secured to the links, cutter carried by the plow-beam, a lever, a suitable support therefor, and means connecting the lever and plow-beam.

In witness that I claim the foregoing I have hereunto subscribed my name this 3d day of July, 1902.

THOMAS J. HUBBELL.

Witnesses:
M. C. NICKELESON,
G. E. HARPHAM.